George Herbert Colt and
Arthur John Chappell
Inventors

By
Haseltine, Lake & Co
Attorneys

FIG.4.

June 10, 1947.  G. H. COLT ET AL  2,421,774
APPARATUS FOR ENUMERATING AND INDICATING THE NUMBER OF AVAILABLE
SEATS ON THE DECKS OF PASSENGER CARRYING VEHICLES
Filed Aug. 14, 1943  4 Sheets-Sheet 4

INVENTORS.
George Herbert Colt
Arthur John Chappell
BY
Haseltine, Lake & Co.
ATTORNEYS.

Patented June 10, 1947

2,421,774

UNITED STATES PATENT OFFICE 2,421,774

APPARATUS FOR ENUMERATING AND INDICATING THE NUMBER OF AVAILABLE SEATS ON THE DECKS OF PASSENGER CARRYING VEHICLES

George Herbert Colt, London, and Arthur John Chappell, Middlesborough, England

Application August 14, 1943, Serial No. 498,741
In Great Britain March 10, 1943

6 Claims. (Cl. 235—99)

This invention relates to apparatus for enumerating and indicating the number of available seats on the decks of passenger carrying vehicles, the apparatus forming the subject of the present invention being an improvement in or modification of the invention forming the subject of prior British Patent No. 505,008.

Apparatus in accordance with the present invention for the purpose specified is actuated electrically as the result of the closure of switches associated with three adjacent or successive treads on the stairway leading to the upper deck or decks. These treads are depressible and spring-returned and thus capable of actuating the switches associated with them when a passenger ascends to or descends from the deck. The apparatus includes one or more dials or bands or like indicators for enumerating and indicating the number of seats available on the deck. Two ratchet mechanisms, comprising each a ratchet wheel and a pawl, are provided the one for moving the counting and indicating device in one direction, the other in the other direction. A source of electric current is provided which by means of the three switches associated with the treads may be connected to or disconnected from three circuits. Two of these circuits, those associated with the first and the third, or uppermost and lowermost of three successive, treads contain the exciter winding of a slow release solenoid each, whereas the circuit associated with the second or middle tread contains the exciter winding of a fast release solenoid.

An actuating mechanism for the pawls is provided operable by the fast release solenoid or solenoids connected to the second circuit. The slow release solenoids mutually have contacts in their circuits, the contacts of one circuit controlled or steered by the core of the slow release solenoid in the other circuit and conversely. On depression, therefore, of the first or of the third tread, the circuit of the first tread or, respectively, of the third tread, will instantaneously be closed and the circuit of the third tread or, respectively, of the first tread will be blocked sufficiently long, owing to the slow release of the solenoids, to allow a passenger to reach and leave the third or, respectively, the first tread.

The circuits of the first and the third treads are thus operated one to the exclusion of the other.

The cores of the slow release solenoids further control selectively, mechanically or electrically, a selector mechanism. This mechanism when a passenger descends the stairway and the switch associated with the first tread is closed by the weight of the passenger depressing the tread, will select the proper pawl of the two ratchets. When the second tread is depressed after the first, the selected pawl will be actuated by means of the first release solenoid controlled by the second tread through the pawl actuating mechanism. The indicator will then show that one seat more is available.

If, however, a passenger ascends the stairway, the third tread will be depressed first and the pawl of the other ratchet will be selected and, on depression of the second tread, be actuated so as to cause the indicator to show that one seat less is available.

In order that the said invention may be clearly understood and readily carried into effect, the same will now be more fully described with reference to the accompanying drawings, in which.

The dial D is numbered from 0 to the maximum number of seats on the upper deck of a vehicle. The numbers may be on the face or faces or on the periphery of the dial or on all three so as to be visible in two or three directions and to avoid confusion when indicating numbers of ten or over these may be situated on a different part of the dial to that carrying the units. If necessary, the numbers on the periphery may be arranged in positions displaced either forwards or backwards from their positions on the face of the dial but always so that the same enumeration is indicated, the dial being mounted in any convenient position so as to show the number of seats available through apertures. Only one number is visible through any one aperture, the rest being covered. The location of each dial will vary with the construction of the body-work of the vehicle. Each dial may be illuminated in any suitable manner so as to make the numbers showing at the apertures clearly visible in any direction. Other dials may be arranged in different parts of the vehicle, connected to dial D by any known form of mechanical or electrical means so as to be actuated with dial D and arranged to show in a similar manner the same number as that shown on dial D, the arrangement being such that the numbers can be easily seen by anyone on the platform, or if more than one disc is employed from other convenient view points.

The Dial D may be replaced by a band or tape D1 (Fig. 5) of suitable material mounted upon and moved by a drum (not shown) actuated in a similar manner to dial D.

The position of dial D or band D1 is controlled by means of a ratchet C secured to it and having as many recesses as there are numbers on dial D. A roller R registers into each recess, one at a time, and is held down by a spring S1, suitably clamped. As the ratchet C is turned, the roller R moves against the resistance of spring S1 until the next recess comes beneath it, when spring S1 will force roller R home so as to register accurately in this recess and bring the corresponding number on dial D to a true location in the space where it is visible. The dial D or band D1 thus moves exactly one number forward or backward with each movement communicated to it. The dial D or band D1 may be re-set by the conductor or any other authorized person, by the insertion of a key (not shown) into suitably located and shaped hole H in, for instance, the hub of dial D, or by any other known means.

Figure 1:
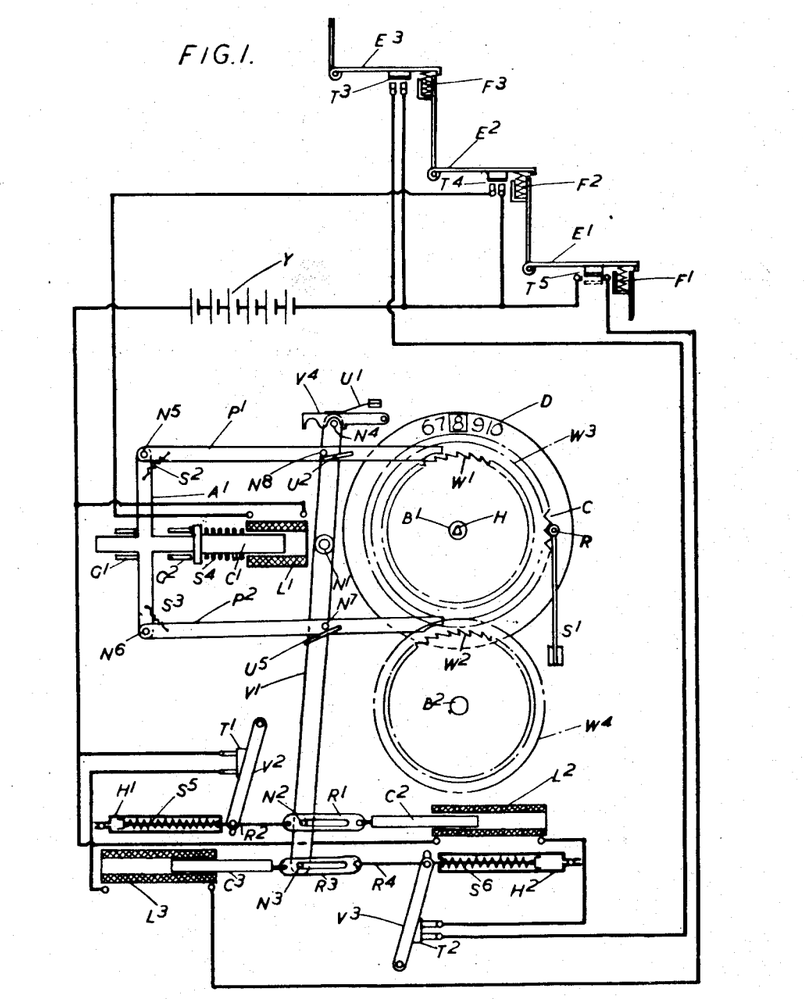
Figure 1 is a drawing in vertical plan showing the chief parts of the mechanism.

The mechanism may be arranged in any of three different ways. The first arrangement is shown in Figure 1 in which dial D, securely mounted on a suitably supported spindle B1 is driven in one direction (clockwise) by a ratchet wheel W1 which is securely mounted on the spindle B1 or in the opposite direction (anti-clockwise) by ratchet wheel W2, securely mounted on a suitably supported spindle B2, in conjunction with spur gear wheels W3, securely mounted on spindle B1, and W4, securely mounted on spindle B2, which gear wheels are in constant mesh.

Ratchet wheel W1 is actuated by pawl P1, and for each movement communicated to it turns dial D or band D1 by exactly one space, thereby decreasing the number showing by one. Ratchet wheel W2 is actuated by pawl P2 and for each movement communicated to it, turns dial D or band D1 by exactly one space, thereby increasing the number showing by one. Pawl P1 is carried by and moved by a cross shaped arm A1, to which it is secured at the upper end by pin N5 arranged so that pawl P1 can move vertically, which movement is controlled by spring S2, in tension, and which tends to keep pawl P1 in its lowest possible position.

Similarly, pawl P2 is carried by and moved by arm A1 to which it is secured at the lower end by pin N6 arranged so that pawl P2 can move vertically, which movement is controlled by spring S3, which is in compression and which tends to keep pawl P2 in its lowest possible position. Arm A1 is made to move horizontally to the right in suitably supported guides G1 and G2 by the action of solenoid L1 when this is energized and which then causes core C1 to move to the right against the resistance of spring S4, which is in compression.

Core C1 is secured to arm A1 and the two move together. When solenoid L1 ceases to be energized, core C1 and arm A1 are moved back to the left by the action of spring S4.

Figures 5, 7, 8:
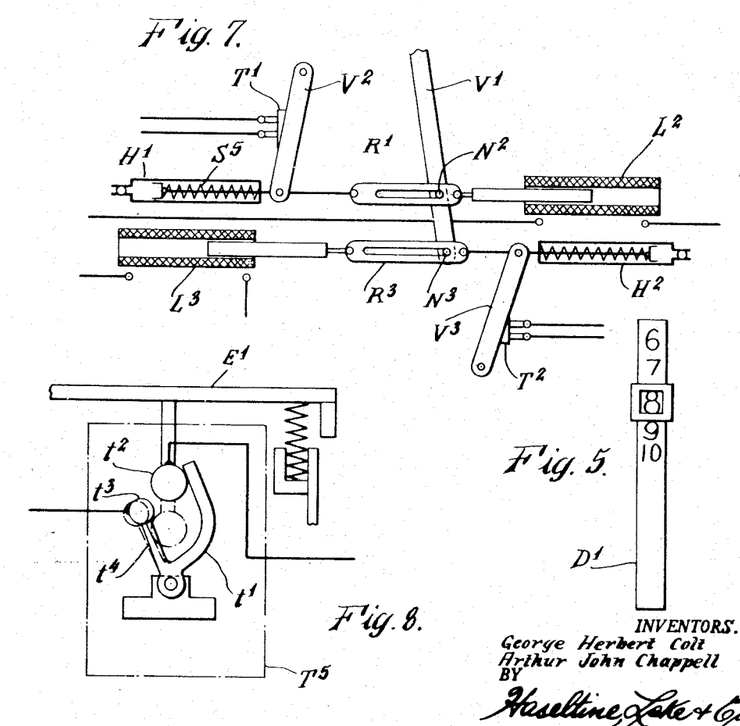
Fig. 5 shows a front view of another form of a dial.
Figs. 6 and 7 show the lower part of Fig. 1 with various positions of the solenoid actuated elements.
Figure 8 shows in detail a switch mechanism well adapted to perform the function of switch T5 in Figures 1 through 4.
Figure 6:
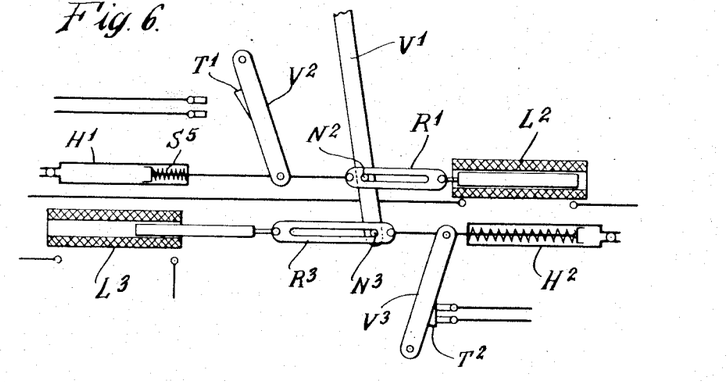

The positions of pawls P1 and P2 are controlled by means of lever V1 which can turn about pin N1 suitably supported and fixed. Lever V1 carries at its lower end two pins N2 and N3, by which this end may be moved to the right and left respectively. Pin N2 is engaged by a slot in link R1, which encloses pin N2 and which is rigidly attached to core C2 of solenoid L2, also to rod R2 of dash-pot H1 and also to one end of lever V2 which lever is pivoted at its other end. Spring S5 controls the system consisting of core C2, link R1, rod R2 and lever V2 in conjunction with solenoid L2 and dash-pot H1. Lever V2 carriers a switch T1 which is closed when lever V2 is in its extreme left-hand position and which is opened as soon as any movement of lever V2 to the right occurs. When solenoid L2 is energized, core C2, link R1 and rod R2 are moved to the right and this movement causes lever V1 to move anti-clockwise about pin N1. Dash-pot H1 allows this movement to be rapid, but when solenoid L2 ceases to be energized and spring S5 causes the return movement of core C2, link R1 and rod R2, dash-pot H1 causes this movement to be slow, the degree of retardation being controlled by suitable adjustment of dash-pot H1. When solenoid L2 is energized, switch T1, as Fig. 6 shows, is opened and it remains open until the moving system is returned by the action of spring S5 to its original position. The return movement of the system, as shown in Fig. 7, does not effect any movement of lever V1, which remains with the lower end thrown over to the right, owing to pin N2 moving freely inside link R1. Thus pin N2 is only used to move lever V1 in the anti-clockwise direction.

Similarly pin N3 engages with a moving system consisting of core C3 of solenoid L3, link R3, rod R4 and lever V3, which system is controlled by dash-pot H2 and spring S6. Pin N3 can move freely in a slot in link R3. Solenoid L3, when energized, causes core C3, link R3 and rod R4 to move quickly to the left and thereby causes lever V1 to move clockwise, at the same time opening switch T2 attached to lever V3.

When solenoid L3 ceases to be energized, spring S6 causes the return of the moving system to the right, this movement being slow owing to the retarding action of dash-pot H2. This return movement does not affect lever V1 as pin N3 moves freely in a slot in link R3. Thus pin N3 is used to move lever V1 clockwise only.

The amount of movement of lever V1 is controlled by lever V4, pivoted at one end and having two suitably shaped recesses at the other end, either of which will engage with pin N4 attached to lever V1 so that lever V1 is in one extreme position when pin N4 is in one recess of lever V4 and in the opposite extreme position when pin N4 is in the other recess of lever V4. Lever V4 is controlled by spring U1. Lever V1 carries two flat projecting tables U2 and U5, rigidly secured to it and suitably positioned and arranged so that the upper table U2 bears upon a pin N8 attached to pawl P1 and projecting from it, and the lower table U5 bears upon pin N7 attached to pawl P2 and projecting from it, in such a manner that when lever V1 is in the position illustrated pawl P2 is raised so as to clear ratchet wheel W2 when moved to the right under the action of solenoid L1, while pawl P1 remains in such a position that it will engage with and move ratchet wheel WI when moved to the right by the action of solenoid LI when energized. Thus, when lever VI is in the position illustrated, the energizing of solenoid LI will cause dial D or band DI to move clockwise and decrease by one the number of vacant seats indicated for every movement communicated to it. The opposite action takes place when lever VI is moved over to the opposite position. Table U2 will now lift pawl PI by means of pin N8 so that it will clear ratchet wheel WI, while table U5 will lower pin N7 and allow pawl P2 to engage with and move ratchet wheel W2 when both pawls are moved to the right by the action of solenoid LI when energized. Thus when lever VI is in the opposite position to that illustrated, the energizing of solenoid LI will cause dial D or band DI to move anti-clockwise and increase the number of vacant seats indicated by one.

The foregoing actions are set in motion by the action of passengers going up or down the stairway. Three adjacent treads in the stairway, EI, E2 and E3 are arranged to pivot about their inner ends so that each has a small vertical movement. Springs FI, F2 and F3 tend to keep the treads in their uppermost positions and are of such strength that the weight of a passenger on the tread will depress the tread but when the weight of the passenger is removed from the tread, it will immediately return to its uppermost position under the action of the spring. Switches T3 under tread E3 and T4 under tread E2 are arranged so that when the tread is depressed by the weight of the passenger coming on to the tread, the switches are closed. The switch T5 under the tread EI is a tilting switch arranged so as to close when the tread EI is half depressed by the weight of the passenger coming on to it and when fully depressed to be opened. In the embodiment illustrated in Figure 8, said switch includes a V-shaped member which is pivoted at *t* such member having one longer limb *t1* which is bowed and a second shorter limb *t4* which serves to carry one of the switch contracts, i. e. the contact *t3*. The second contact *t2* of the switch is associated with the depressible tread EI and the arrangement is such that as the tread is depressed the contact *t2* will be caused momentarily to engage the contact *t3* and to effect closure of the appropriate circuit. With continued depression of said tread, the contact *t2* will move past the contact *t3* and will abut against the limb *t4* thereby causing the V-shaped member to move about its pivot *t* and moving the contact *t3* out of the path of return movement of the contact *t2*. As the tread rises when the weight of the passenger is removed therefrom, the contact *t2* will ride up against the bowed limb *t1* which has been brought into its path of movement due to the pivotal movement of the V-shaped member and will thus cause said member to be returned to its initial position so that upon further depression of the tread the contact *t3* will again be in the path of the contact *t2*. The electrical battery Y of the vehicle X is connected through switch T5 under tread EI with solenoid L3 and switch TI all in series; through switch T4 under tread E2 with solenoid LI, and through switch T3 under tread E3 with switch T2 and solenoid L2 all in series.

The action of the mechanism is as follows:

When passengers are going up the stairway the passenger first moves on to tread EI, depresses it and closes switch T5. This completes an electrical circuit from battery Y through switch T5, switch TI, which is closed, to solenoid L3, which is energized. The moving system consisting of core C3, rod R4, link R3 is now moved to the left by the magnetic effect of solenoid L3 and this causes pin N3 to throw lever VI clockwise into the position illustrated, in which pawl PI is lowered ready for engagement with ratchet wheel WI and pawl P2 is raised so as to clear ratchet wheel W2. At the same time switch T2 attached to lever T3 is opened.

When the passenger's weight is removed from tread EI, switch T5 will be opened and the moving system consisting of core C3, rod R4 and link R3 will move slowly back to the right under the influence of spring S6 retarded by dash-pot H2. Lever VI will remain unaffected by this return movement, which is so regulated that it is not completed until the ascending passenger has got clear of tread E3.

When the passenger moves on to tread E2, this is depressed and closes switch T4, which completes the electrical circuit from battery Y, through switch T4 to solenoid LI, which is now energized. Core CI, is moved to the right by the magnetic action of solenoid LI and this causes pawl PI to move ratchet wheel WI by one tooth, thereby moving dial D or band DI by one space so that the number of vacant seats indicated is decreased by one. When the weight of the passenger is removed from tread E2, switch T4 is opened, solenoid LI is no longer energized and spring S4 moves core CI, arm AI and pawls PI and P2 to the left, placing them ready for the next movement.

When the passenger moves on to tread E3, his weight will depress it and close switch T3, but since the circuit from battery Y through switch T3 to solenoid L2 includes switch T2 which is open owing to the retarding action of dash-pot H2, nothing further happens.

A succession of passengers moving up the stairway will keep lever VI in the position illustrated and as each passenger moves on to tread E2 dial D or band DI will move so as to indicate one vacant seat less. When the succession of passengers has moved off the tread EI, the action of spring S5 retarded by dash-pot H2 will slowly allow switch T2 to close, and the mechanism is then ready to register passengers descending the stairway. When, on coming down the stairway, the passenger moves on to tread E3 switch T3 is closed and this puts solenoid L2 into electrical connection with battery Y through switch T2 which is now closed. Lever VI is moved anti-clockwise to its opposite extreme position, pawl PI is put out of action, and pawl P2 is put into action position. When the passenger moves on to tread E2 switch T4 is closed and the battery Y is put into electrical connection with solenoid LI which is energized and causes pawl P2 to move dial D or band DI by one space thereby increasing the number of vacant seats indicated by one. When the passenger moves off this tread, switch T4 is opened, solenoid LI is no longer energized and sping S4 returns pawl P2 to the left ready for a fresh stroke. When the passenger moves onto tread EI switch T5 is closed. As this switch is only in electrical connection with solenoid L3 when switch TI is closed, nothing further happens, because switch TI is still open owing to the retarding action of dash-pot HI. A succession of passengers coming down the stairway will have the effect of keeping lever VI continually in the opposite position to that shown and of keeping switch T1 open, so that as each passenger moves on to tread E2, the number of vacant seats indicated will increase by one.

Provision is made by a special arrangement of switch T5 under tread E1 whereby, when the tread is depressed, switch T5 is closed when tread E1 has completed half its movement, and when tread E1 is in its lowest position, switch T5 is open. This is to counteract the effect of a passenger standing on tread E1 long enough for switch T1 to close again, as might occur were he waiting to dismount from the vehicle. If switch T5 were in fact closed, lever V1 would be moved over to the position illustrated and by causing switch T2 to open, would put switch T3 on tread E3 out of action, so that another passenger coming down the stairway would, on moving on to tread E2 register one less seat vacant instead of one more. This is avoided by allowing tread E1 on being depressed to close switch T5 for a moment and then to open it again. Anyone standing on tread E3 would maintain the correct setting of the mechanism for increasing the number indicated by passengers descending the stairway. Anyone standing on tread E2 would not affect matters since registering is done on the downstroke of the tread. Anyone standing on tread E3 would thereby maintain the mechanism in a correct setting for increasing the number of vacant seats indicated.

Figure 2:
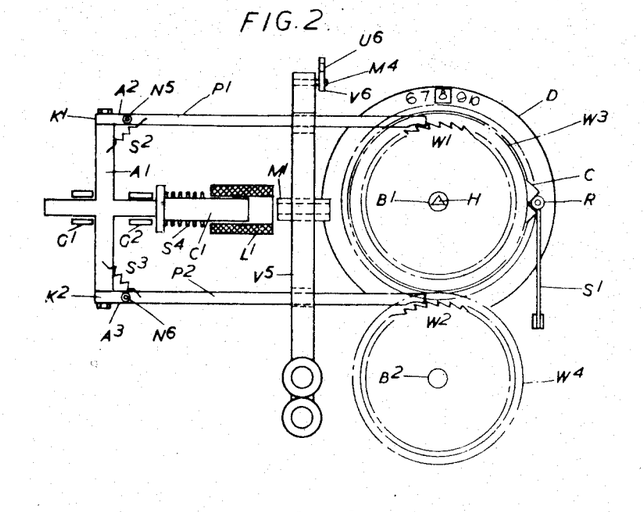
Figure 2 is a drawing showing in part a modified mechanism in which certain mechanical parts of the mechanism shown in Figure 1 are replaced by other mechanical parts giving an alternative method of producing the same effect.
Figure 3:
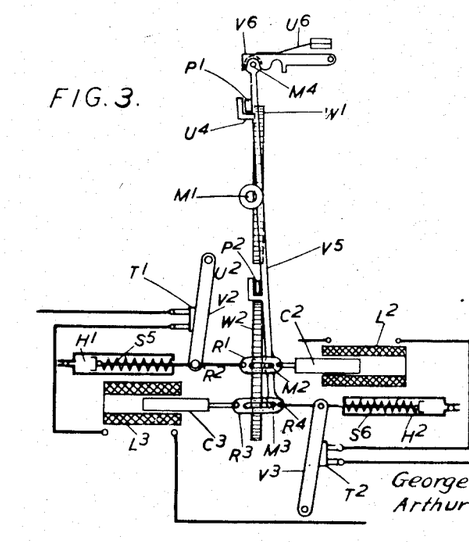
Figure 3 shows another view of the parts shown in Figure 2.

The second arrangement of the mechanism is shown in Figures 2 and 3. This arrangement is the same as the first arrangement in all respects with the exception of the following:

Pawl P1 is connected by pin N5 to an arm A2, which is connected with arm A1 by pin K1 arranged to allow arm A2 and pawl P1 horizontal movement. Pawl P1 now has both horizontal and vertical movement. Similarly pawl P2 is connected with arm A3 by pin N6 and arm A3 is connected with arm A1 by pin K2 arranged to allow arm A3 and pawl P2 horizontal movement. Pawl P2 now has both horizontal and vertical movements. Tables U2 and U5 and pins N5 and N7 are done away with. Lever V1 with pins N1, N2 and N3 and N4 is replaced by lever V5 moving about fixed pin M1 with pins M2, M3 and M4, atttached to lever V5. The amount of the movement of lever V5 is controlled by lever V6, pivoted at one end, controlled by spring U6 and having two recesses at the other end which engage, one at a time with pin M4 on lever V5. Pin M2 on lever V5 engages with link R1 of the moving system consisting of core C2, rod R2, link R1 and lever V2 carrying switch T1, which system is moved to the right by the magnetic effect of solenoid L2 when energized, against the resistance of spring S5 and which is returned to the left by spring S5 retarded by dash-pot H1. Pin M2 can move freely inside link R1, which is used only to move lever V5 in the anti-clockwise direction. Pin M3 on lever V5 engages with link R3 of the moving system consisting of core C3, rod R4, link R3 and lever V3 carrying switch T2, which system is moved to the left by the magnetic effect of solenoid L3 when energized, against the resistance of spring S6 and which is returned to the right by spring S6 retarded by the action of dash-pot H2. Pin M3 on lever V5 can move freely inside link R3, which is used only to move lever V5 in the clockwise direction. Lever V5 carries a bracket U4 suitably shaped so as to support and guide pawl P1 and by the lateral movement of lever V5 either to allow pawl P1 to engage with ratchet wheel W1 when pawl P1 is moved to the right, or to prevent engagement by guiding pawl P1 to the side of ratchet wheel W1, according to the position of lever V5.

Lever V5 also carries a bracket V8 suitably shaped so as to support and guide pawl P2 and by the lateral movement of lever V5 either to allow pawl P2 to engage with ratchet wheel W2 when pawl P2 is moved to the right, or to prevent engagement by guiding pawl P2 to the side of ratchet wheel W2 according to the position of lever V5.

The action of the mechanism is as follows:

When passengers are going up the stairway the passenger first moves on to tread E1, depresses it, closes switch T5, which causes solenoid L3 to be energized. Core C3, link R3 and rod R4 move to the left, switch T2 is opened and lever V5 is moved clockwise by pin M3 engaging with link R3. This brings pawl P1 into line with ratchet wheel W1 and pawl P2 out of line with ratchet wheel W2, through the movement of brackets U4 and U5 attached to lever V5. When the passenger moves off tread E1, solenoid L3 is no longer energized and core C3, link R3, rod R4 and lever V3 commence to return to the right under the action of spring S6 retarded by dash-pot H2. This return movement is not completed until the passenger is clear of tread E3. When the passenger moves on to tread E2, switch T4 is closed, solenoid L1 is energized, core C1, arms A1, A2 and A3, together with pawls P1 and P2 are moved to the right. Pawl P1 now engages with ratchet wheel W1 and moves it so that dial D or band D1 is moved clockwise by one space, thereby decreasing the number of vacant seats indicated by one. Pawl P2 in making the same movement as pawl P1 does not move ratchet wheel W2, since it is guided by guide U5 on lever V5 to one side of ratchet wheel W2. When the passenger moves off tread E2, switch T4 is opened, solenoid L1 is no longer energized, and spring S4 will move core C1, arms A1, A2 and A3 together with pawls P1 and P2 back to their original positions ready for a fresh movement. When the passenger moves on to tread E3, switch T3 is closed, but since switch T2 in circuit with switch T3 is open, nothing further happens. A succession of passengers ascending the stairway will thus keep lever V5 in the opposite position to that illustrated and as each passenger moves on to tread E2, the dial D or band D1 will move so as to indicate one vacant seat less.

When all ascending passengers have got clear of tread E3, the core C3, link R3, rod R4 and lever V3 will move over to their extreme right hand positions so that switch T2 is closed, and the mechanism is then ready to register passengers going down the stairway.

When passengers are going down the stairway, the passenger first moves on to tread E3, depresses it, closes switch T3, which causes solenoid L2 to be energized. Core C2, link R1 and rod R2 move to the right, switch T1 is opened and lever V5 is moved anti-clockwise by pin M2 engaging with link R1. This brings pawl P2 into line with ratchet wheel W2 and pawl P1 out of line with ratchet wheel W1, through the movements of brackets U4 and U8 attached to lever V5. When the passenger moves off tread E3, solenoid L2 is no longer energized and core C2, link R1, rod R2 and lever V2 commence to return to the left under the action of spring S5 retarded by dash-pot H1. This return movement is not completed until the passenger has got clear of tread E1, unless he remains on tread E1 as when waiting to dismount at a stopping place, for which special provision is made. When the passenger moves on to tread E2, switch T4 is closed, solenoid L1 is energized, core C1, arms A1, A2 and A3, together with pawls P1 and P2 are moved to the right. Pawl P2 now engages with ratchet wheel W2 and moves it so that dial D or band D1 is moved anti-clockwise by one space, thereby increasing the number of vacant seats indicated by one. Pawl P1 in making the same movement as pawl P2 does not move ratchet wheel W1 since it is guided by bracket U4 on lever V5 to one side of ratchet wheel W1. When the passenger moves off tread E2, switch T4 is opened, solenoid L1 is no longer energized, and spring S4 will move core C1, arms A1, A2 and A3 together with pawls P1 and P2 back again to their original positions ready for a fresh movement. When the passenger moves on to tread E1, switch T5 is closed, but since T1 is open, nothing further happens. Thus a succession of passengers moving down the stairway will, by continually closing switch T3 under tread E3, keep the mechanism set, so that as each passenger moves onto tread E2 and thereby closes switch T4, dial D or band D1 will indicate one more vacant seat.

The special arrangement of switch T5 under tread E1 is retained and works as before described.

Figure 4:
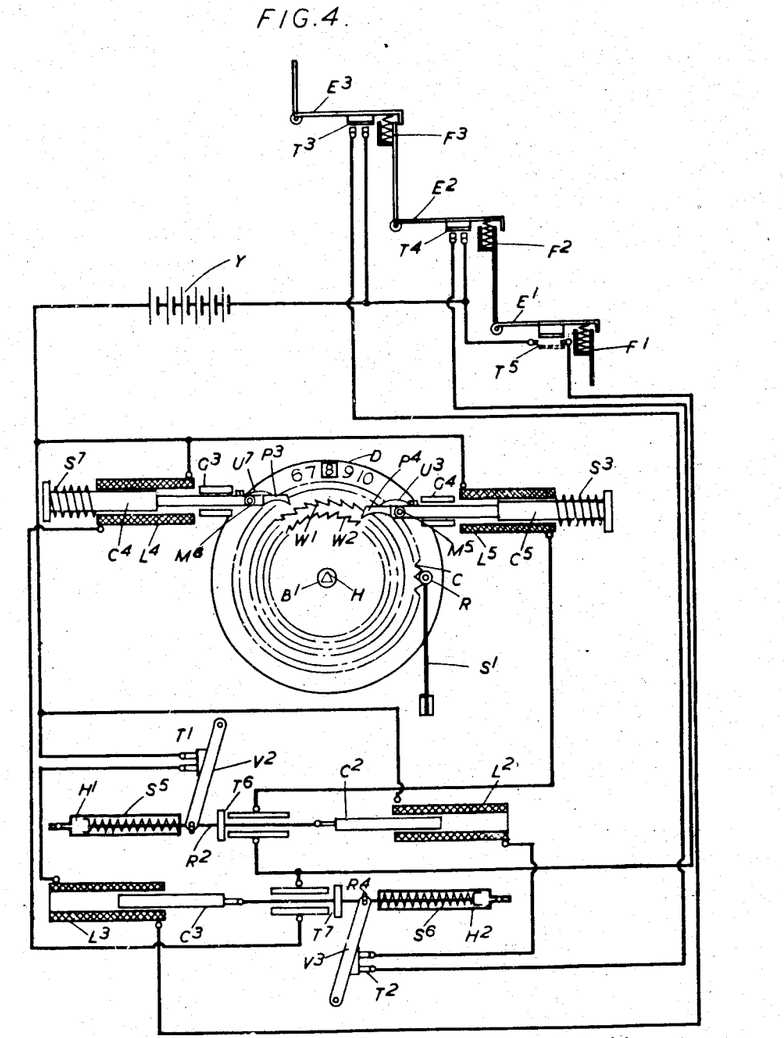
Figure 4 shows an alternative arrangement of the mechanism in which certain mechanical parts are replaced by electrical parts.

The third arrangement of the mechanism is shown in Figure 4. In this arrangement dial D, band D1, ratchet C and ratchet wheel W1 are mounted on spindle B1 and the position of ratchet C is controlled by roller R and spring S1 as before described. Ratchet wheel W2 is now also mounted on spindle B1 at the side of ratchet wheel W1 so that ratchet wheels W1 and W2 and ratchet C rotate together with spindle B1. Ratchet wheel W1 is moved by pawl P3 kept down by the pressure exerted by spring U7. Pawl P3 is capable of vertical movement about pin M6 which is carried on an extension of core C4 of solenoid L4. This extension of core C4 is guided by guide G3 so that when core C4 moves to the right, pawl P3 will engage with and move ratchet wheel W1 clockwise. On the return movement of core C4 to the left, pawl P3 will lift against the pressure of spring U7 over the teeth of ratchet wheel W1 and will not cause any movement. In its extreme left hand position to which it is returned by spring S7, which is in compression, core C4 will withdraw pawl P3 so that it is clear of ratchet wheel W1. The movement of core C4 and pawl P3 to the right against the compression of spring S7 is due to the magnetic effect of solenoid L4 when energized, and this movement is arranged so that it will move dial D or band D1 by one space clockwise, so as to indicate one number less for each movement to the right of core C4 and pawl P3. Similarly ratchet wheel W2 is moved by pawl P4 kept down by the pressure of spring U3. Pawl P4 is capable of vertical movement about pin M5, which is carried on an extension of core C5 of solenoid L5. This extension of core C5 is guided by guide G4 so that when core C5 moves to the left, pawl P4 will engage with and move ratchet wheel W2 anti-clockwise. On the return movement of core C5 to the right, pawl P4 will lift against the pressure of spring U3 over the teeth of ratchet wheel W2 and will not cause any movement. In its extreme right hand position to which it is returned by spring S3, which is in compression, core C5 will withdraw pawl P4 so that it is clear of ratchet wheel W2. The movement of core C5 and pawl P4 is due to the magnetic effect of solenoid L5 when energized, and this movement is arranged so that it will move dial D or band D1 by one space anti-clockwise, so as to indicate one number more for each movement to the left of core C5 and pawl P4.

Instead of pawls P3 and P4 being pivotally connected to the extension of cores C4 and C5 they may each be mounted on a lever pivotally mounted at a convenient point, such lever being pivotally connected at any other point in its length to the adjacent core extension. Cores C4 and C5 and pawls P3 and P4 may be otherwise connected in any known manner so as to give the requisite movement to the pawls P3 and P4.

Solenoid L2, core C2, dash-pot H1, spring S5, rod R2, lever V2 and switch T1 are arranged as before described in line but rod R2 and core C2 are connected by the moving element of a switch T6. Switch T6 is open when core C2 is in its extreme left hand position, but is closed as soon as core C2 moves to the right and as the movable element or bridge of switch T6 slides over the longitudinally extended contact pair of this switch, switch T6 will remain closed during all the further movement of core C2 to the right and until core C2 returns again to its extreme left hand position under the influence of spring S5 retarded by dash-pot H1. Switch T6 is open as long as switch T1 is closed but is closed as long as switch T1 is open.

Similarly solenoid L3, core C3, rod R4, dash-pot H2, spring S6, lever V3 and switch T2 are arranged as before described in line, but rod R4 and core C3 are connected by the moving element of a switch T7. Switch T7 is open when core C3 is in its extreme right hand position, but is closed as soon as core C3 moves to the left and, as the bridge of switch T7 slides over the longitudinally extended contact pair of this switch, switch T7 will remain closed during all the further movement of core C3 to the left and until core C3 returns again to its extreme right hand position under the influence of spring S6 retarded by dash-pot H2. Switch T7 is open as long as switch T2 is closed but is closed as long as switch T2 is open.

Battery Y is in electrical connection as follows:

Switch T5 under tread E1 is connected in series with battery Y solenoid L3 and switch T1 so that when switch T5 is closed, solenoid L3 is energized, provided that switch T1 is also closed. Switch T3 under tread E3 is connected in series with battery Y, switch T2 and solenoid L2 so that solenoid L2 is energized when switch T3 is closed, provided that switch T2 is also closed.

Switch T4 under tread E2 is connected in series with two circuits, one of which consists of switch T6 and solenoid L5 arranged in series with each other and the other circuit consisting of switch T7 and solenoid L4 also arranged in series with each other. Solenoid L4 is energized when tread E2 is depressed by the weight of the passenger thereby closing switch T4, provided that switch T7 is closed. Solenoid L5 is energized when tread E2 is depressed by the weight of the passenger, thereby closing switch T4 provided that switch T6 is closed. Thus either solenoid L4 or solenoid L5 is energized when switch T4 is closed by the weight of the passenger on tread E2.

The action of the mechanism is as follows:

When passengers are going up the stairway, the passenger first moves on to tread E1, depresses it and closes switch T5. This puts battery Y into electrical connection with solenoid L3 through switch T1 which is closed. The magnetic action of solenoid L3, now energized, causes core C3 and rod R4 to move to the left, thereby opening switch T2 and closing switch T7. This motion is rapid. When the passenger's weight is removed from tread E1, switch T5 is opened and solenoid L3 is no longer energized. Core C3 and rod R4 now commence to move to the right under the influence of spring S6, which motion is retarded by dash-pot H2, the degree of retardation being such that the return motion is not completed until the passenger is clear of tread E3. Until this motion is complete, switch T2 remains open and switch T7 remains closed. When the passenger moves on to tread E2, and depresses it, switch T4 is closed and this puts battery Y into electrical connection with solenoid L4 through switch T4 and switch T7, which is closed. The magnetic action of solenoid L4, which is now energized, causes core C4 and pawl P3 to move to the right. Pawl P3 engages with ratchet wheel W1, moving it clockwise by one tooth, thereby also moving dial D or band D1 by one number so as to indicate one less vacant seat. When the passenger's weight is removed from tread E2, switch T4 is opened and solenoid L4 is no longer energized. Core C4 and pawl P3 are then moved back to the left to their original positions by the action of spring S7 and are then ready for a fresh movement. When the passenger moves on to tread E3, depresses it and thereby closes switch T3, nothing further happens since no electrical circuit is completed owing to switch T2 still being open. A succession of passengers moving up the stairway would, by continually depressing tread E1, keep switch T2 open and switch T7 closed, so that as each passenger moved on to tread E2, he would cause dial D or band D1 to register one less vacant seat available. When the succession of passengers had got clear of tread E3, the action of spring S6 will close switch T2 and open switch T7, and the mechanism will then be ready to register passengers moving down the stairway.

When passengers are moving down the stairway, the passenger first moves on to tread E3, depresses it and thereby closes switch T3. This puts battery Y into electrical connection with solenoid L2 through switch T3 and switch T2, which is closed. The magnetic action of solenoid L2, now energized, causes core C2 and rod R2 to move to the right, thereby opening switch T1 and closing switch T6. This motion is rapid. When the passenger's weight is removed from tread E3, switch T3 is opened and solenoid L2 is no longer energized. Core C2 and rod R2 commence to move to the left under the influence of spring S5 retarded by dash-pot H1, the degree of retardation being such that the return motion is not completed until the passenger is clear of tread E1. Until this motion is complete, switch T1 remains open and switch T6 remains closed. When the passenger moves on to tread E2 and depresses it, switch T4 is closed and this puts battery Y into electrical connection with solenoid L5 through switch T4 and switch T6, which is closed. The magnetic action of solenoid L5 causes core C5 and pawl P4 to move to the left. Pawl P4 now engages with ratchet wheel W2, moving it anti-clockwise by one tooth and thereby also moving dial D or band D1 by one number so as to indicate one more vacant seat. When the passenger's weight is removed from tread E2, switch T4 is opened and solenoid L5 is no longer energized. Core C5 and pawl P4 are then moved back to the right to their original positions by the action of spring S3 and are then ready for a fresh movement. When the passenger moves on to tread E1, depresses it and thereby closes switch T5, nothing further happens as no electrical circuit is completed owing to switch T1 still being open. Thus a succession of passengers moving down the stairway will, by continually depressing tread E3, and closing switch T3, keep switch T1 open and switch T6 closed so that as each passenger moves on to tread E2 he will cause dial D or band D1 to register one more vacant seat available. When the succession of passengers has got clear of tread E1, the action of spring S5 will close switch T1 and open switch T6 and the mechanism will then be ready to register passengers going up the stairway again. The special arrangement of the switch T5 under tread E1 is still made and acts as before described.

In certain of the newer forms of vehicle, a second stairway is provided, and that centrally. When this is the case suitable rods, levers or electrical connections are provided to duplicate some or all of the mechanism and cause both portions to register on the dials. When, as may occur at a terminus, passengers leave by an extra or front stairway, the conductor re-sets the dial by hand after the passengers have left and before others have entered the vehicle. These provisions will apply equally to vehicles having more than one upper deck.

What we claim and desire to secure by Letters Patent of the United States is:

1. Apparatus for enumerating and indicating the number of available seats on the deck of a passenger carrying vehicle including in combination three treads adapted to be elastically depressed in succession by passengers ascending to or descending from said deck, a counting and indicating device, two ratchet mechanisms, one adapted to operate said counting and indicating device in one direction, the other in the other direction, three electric circuits adapted to be connected to and fed by a source of electric current, each tread having a switch mounted thereto, adapted for control of one of said circuits, slow release solenoids included in those of said circuits which are controlled respectively by the first and the third of said treads, said circuits of said slow release solenoids including, reciprocally, switching means in one circuit adapted to be actuated by the slow release solenoid of the other circuit for maintaining the other of said circuits in open condition until a passenger has passed, starting from the tread associated with one of said circuits, the tread associated with said other circuit, and vice versa, at least one fast release solenoid included in the circuit controlled by the second of said treads; actuating mechanism operable by said fast release solenoid for the pawls of said ratchet mechanisms; selector mechanism adapted to be operated alternatively by said slow release solenoids and further adapted to select either of said pawls for operation of its ratchet by means of said actuating mechanism, thereby to actuate one of said ratchet mechanisms when a passenger ascends said treads and the other of said ratchet mechanisms when a passenger descends said treads.

2. Apparatus for enumerating and indicating the number of available seats on the deck of a passenger carrying vehicle including in combination three treads adapted to be elastically depressed in succession by passengers ascending to or descending from said deck, a counting and indicating device, two ratchet mechanisms, one adapted to operate said counting and indicating device in one direction, the other in the other direction, three electric circuits adapted to be connected to and fed by a source of electric current, and associated one each with one of said treads by having each a normally open contact switch operable by one of said treads; two slow release solenoids, with exciter winding and core each, the exciter winding of one of said slow release solenoids included in the circuit associated with the first of said treads; the exciter winding of the other slow release solenoids included in the circuit associated with the third of said treads; two normally closed contact switches each operatively connected with one of said cores and adapted to be controlled thereby, the contacts of one of said switches disposed in the circuit controlling the other of said switches and vice versa for maintaining, under the slow release action of the one of the said slow release solenoids, in open condition the exciter circuit of the other of said slow release solenoids until a passenger has passed, starting from the tread associated with the first of said solenoids, the tread associated with the other of said solenoids, and vice versa; a fast release solenoid mechanism having exciter winding and core; the circuit associated with the second of said treads being connected to the exciter winding of said fast release solenoid mechanism; actuating means for the pawls of said ratchet mechanisms, the core of said fast release solenoid mechanism operatively connected to said pawl actuating means, each of said slow release solenoids further having operatively connected thereto control means, each one for one of said pawl actuating means thereby to control selectively one of said ratchet mechanisms when the first tread is actuated before the second, and the other of said ratchet mechanisms when the third tread is actuated before the second.

3. Apparatus for enumerating and indicating the number of available seats on the deck of a passenger carrying vehicle including in combination three treads adapted to be elastically depressed in succession by passengers ascending to or descending from said deck, a counting and indicating device, two ratchet mechanisms, one adapted to operate said counting and indicating device in one direction, the other in the other direction, three electric circuits adapted to be connected to and fed by a source of electric current, and associated one each with one of said treads by having each a normally open contact switch operable by one of said treads; two slow release solenoids, with exciter winding and core each, the exciter winding of one of said slow release solenoids included in the circuit associated with the first of said treads; the exciter winding of the other slow release solenoids included in the circuit associated with the third of said treads; two normally closed contact switches each operatively connected with one of said cores and adapted to be controlled thereby, the contacts of one of said switches disposed in the circuit controlling the other of said switches and vice versa for maintaining, under the slow release action of the one of the said slow release solenoids, in open condition the exciter circuit of the other of said slow release solenoids until a passenger has passed, starting from the tread associated with the first of said solenoids, the tread associated with the other of said solenoids, and vice versa; two fast release solenoids each having exciter winding and core, both said exciter windings connected in parallel to the circuit associated with the second of said treads, said pawls operatively connected each with the core of one of said fast release solenoids; two normally open contact switches, the contact pairs of said switches respectively lying one each in the lines of the exciter windings of said fast release solenoids, each of said switches operatively connected to the core of one of said slow release solenoids, thereby to control selectively one of said ratchet mechanisms when the first tread is actuated before the second, and the other of said ratchet mechanisms when the third tread is actuated before the second.

4. Apparatus for enumerating and indicating the number of available seats on the deck of a passenger carrying vehicle including in combination three treads adapted to be elastically depressed in succession by passengers ascending to or descending from said deck, a counting and indicating device, two ratchet mechanisms, one adapted to operate said counting and indicating device in one direction, the other in the other direction, three electric circuits adapted to be connected to and fed by a source of electric current, and associated one each with one of said treads by having each a normally open contact switch operable by one of said treads; two slow release solenoids, with exciter winding and core each, the exciter winding of one of said slow release solenoids included in the circuit associated with the first of said treads; the exciter winding of the other slow release solenoids included in the circuit associated with the thrid of said treads; two normally closed contact switches each operatively connected with one of said cores and adapted to be controlled thereby, the contacts of one of said switches disposed in the circuit controlling the other of said switches and vice versa for maintaining, under the slow release action of the one of the said slow release solenoids, in open condition the exciter circuit of the other of said slow release solenoids until a passenger has passed, starting from the tread associated with the first of said solenoids, the tread associated with the other of said solenoids, and vice versa; a fast release solenoid having exciter winding and core, the circuit associated with the second of said treads being connected to said exciter winding of the fast release solenoid, an actuating arm carried by the core of said fast release solenoid, said actuating arm having pivots for pivotally mounting thereon the pawls of said ratchet mechanisms; an oscillatable selector lever, the cores of said slow release solenoids further carrying each a link, said links adapted, on actuation of either of said slow release solenoids, to engage for single way movement in opposite directions said selector lever; said selector lever adapted to engage selectively said pawls for pivoting them about their respective pivots, the one into, the other out of, the reach of engagement with the ratchet wheels of said ratchet mechanisms, thereby to control selectively one of said ratchet mechanisms when the first tread is actuated before the second, and the other of said ratchet mechanisms when the third tread is actuated before the second.

5. Apparatus for enumerating and indicating the number of available seats on the decks of passenger carrying vehicles and actuated electrically as the result of the closure of switches associated with three adjacent passenger depressible spring-returned stair treads on the stairway leading to the upper deck or decks; said switches associated with the uppermost and the lowermost of said treads having in the respective circuits controlled by them slow release solenoids and, reciprocally, switching means in one of said circuits actuated by the slow release solenoid of the other of said circuits for maintaining the other of said circuits in open condition until a passenger has passed, starting from the tread associated with one of said circuits, the tread associated with said other circuit, and vice versa; said apparatus including at least one indicator enumerated according to the number of seats on the deck or decks, a pawl and ratchet mechanism for moving said indicator in one direction and a further pawl and ratchet for moving said indicator in the opposite direction, solenoid means for actuating said pawl and ratchet mechanism, selector mechanism operable by said solenoid means for ensuring operation of the appropriate pawl and ratchet mechanism to cause the indicator to be moved in the appropriate direction under the action of the solenoid means according to whether a passenger is ascending or descending the stairway, the selector mechanisms being actuated by closing of the switch associated with the lowermost of the three depressible stair treads in the case of a passenger ascending the stairway and by the switch associated with the uppermost of the three depressible stair treads in the case of a passenger descending, the appropriate selected pawl being moved by the solenoid pawl operating mechanism on completion of an electircal circuit by the closing of the switch associated with the intermediate depressible stair tread under the weight of the ascending or descending passenger, the indicator thereby being moved to indicate one less or one more seat available according to whether the passenger is ascending or descending the stairway.

6. Apparatus for enumerating and indicating the number of available seats on the deck of a passenger carrying vehicle adapted to actuate electrically remotely situated counting and indicating means comprising three depressible treads adapted to be operated in succession by passengers ascending or descending to and from the deck, electrically operated means for driving the indicating and counting means in one direction, further electrically operated means for driving the counting and indicating means in the opposite direction, electrically operated selecting means for ensuring operation of the appropriate driving means so that the driving means causes the counting and indicating means to be driven in one direction when a passenger ascends a tread and in the other direction when a passenger descends a tread, the arrangement being that when one of the end treads is depressed an electrical circuit is made which permits of movement of the counting and indicating means in one direction only, the circuit appropriate to the other end tread being cut out, and the combination therewith of checking means to produce a slow return motion of the means which select the direction of rotation to be imparted to the counting and indicating means; said checking means further adapted to maintain said electrically operated selecting means associated with the other of said end treads in inoperative condition until a passenger, starting from one of said end treads, has passed said other end tread, and vice versa.

GEORGE HERBERT COLT.
ARTHUR JOHN CHAPPELL.

REFERENCES CITED

The following references are of record in the file of this patent:

UNITED STATES PATENTS

| Number | Name | Date |
|---|---|---|
| 1,005,681 | Balch et al. | Oct. 10, 1911 |
| 1,743,175 | Wensley et al. | Jan. 14, 1930 |
| 1,872,782 | Messick et al. | Aug. 23, 1932 |
| 2,289,750 | Branham | July 14, 1942 |
| 540,090 | Ellis | May 28, 1895 |

FOREIGN PATENTS

| Number | Country | Date |
|---|---|---|
| 505,008 | Great Britain | May 4, 1939 |
| 232,340 | Great Britain | 1925 |